(12) United States Patent
Tzou et al.

(10) Patent No.: US 10,180,738 B2
(45) Date of Patent: Jan. 15, 2019

(54) ELECTRONIC ASSEMBLY

(71) Applicants: Jyh-Chyang Tzou, Taipei (TW); Tsai-Yu Lin, Taipei (TW); Hsin Yeh, Taipei (TW); Wei-Hao Lan, Taipei (TW)

(72) Inventors: Jyh-Chyang Tzou, Taipei (TW); Tsai-Yu Lin, Taipei (TW); Hsin Yeh, Taipei (TW); Wei-Hao Lan, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/922,874

(22) Filed: Mar. 15, 2018

(65) Prior Publication Data

US 2018/0275780 A1   Sep. 27, 2018

Related U.S. Application Data

(60) Provisional application No. 62/472,535, filed on Mar. 16, 2017.

(51) Int. Cl.
*G06F 3/03* (2006.01)
*G06F 3/0354* (2013.01)
*G06F 1/16* (2006.01)

(52) U.S. Cl.
CPC ........ *G06F 3/03545* (2013.01); *G06F 1/1656* (2013.01); *G06F 2200/1632* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,483,262 A | * | 1/1996 | Izutani | G06F 1/1626 178/19.01 |
| 5,635,959 A | * | 6/1997 | Takeuchi | G06F 1/1626 178/19.01 |
| 5,750,939 A | * | 5/1998 | Makinwa | G06F 3/03545 178/18.01 |

(Continued)

FOREIGN PATENT DOCUMENTS

CN   201260282   6/2009
CN   201839561   5/2011

(Continued)

OTHER PUBLICATIONS

Office Action of Taiwan Counterpart Application, dated Nov. 14, 2018, pp. 1-6.

*Primary Examiner* — Lisa Lea Edmonds
(74) *Attorney, Agent, or Firm* — JCIPRNET

(57) ABSTRACT

An electronic assembly including an electronic device and a stylus is provided. The electronic device includes a housing having a receiving groove and an opening, the opening communicating with the receiving groove, and a first connecting element disposed around the opening. The stylus includes a sleeve and a pen rod. The sleeve has a second connecting element and corresponds to the receiving groove. The second connecting element is combined with the first connecting element to fix the sleeve to the housing. The pen rod is slidably disposed in the sleeve and has a first end and a second end opposite to each other, and a third connecting element located at the first end.

20 Claims, 11 Drawing Sheets

(56) References Cited

U.S. PATENT DOCUMENTS

| | | | | |
|---|---|---|---|---|
| 5,790,100 A * | 8/1998 | Kikinis | G06F 1/1616 | 345/15 |
| 6,114,958 A * | 9/2000 | Murphy | G06F 1/1616 | 200/61.59 |
| 6,161,882 A * | 12/2000 | Murphy | G06F 1/1616 | 292/300 |
| 6,262,684 B1 * | 7/2001 | Stewart | G06F 1/1626 | 178/18.04 |
| 6,353,414 B1 * | 3/2002 | Jones | G06F 1/1626 | 343/702 |
| 7,209,113 B2 * | 4/2007 | Park | G06F 1/1626 | 345/156 |
| 7,362,563 B2 * | 4/2008 | Love | G06F 1/1616 | 178/19.01 |
| 7,382,352 B2 * | 6/2008 | Chadha | G06F 3/0312 | 345/156 |
| 7,522,158 B2 * | 4/2009 | Carlson | G06F 1/1626 | 345/179 |
| 8,059,108 B2 * | 11/2011 | Carlson | G06F 1/1626 | 345/179 |
| 8,325,481 B2 * | 12/2012 | Dong | G06F 1/1613 | 345/179 |
| 8,363,036 B2 * | 1/2013 | Liang | G06F 1/1626 | 178/19.01 |
| 8,390,601 B2 * | 3/2013 | Liang | G06F 1/1613 | 178/19.01 |
| 8,390,602 B2 * | 3/2013 | Liang | G06F 1/1613 | 178/19.01 |
| 8,405,641 B2 | 3/2013 | Tseng | | |
| 8,415,572 B2 * | 4/2013 | Yang | G06F 3/03545 | 178/19.01 |
| 8,462,488 B2 * | 6/2013 | Tseng | G06F 1/1616 | 345/422 |
| 8,692,813 B2 * | 4/2014 | Yeh | G06F 1/1626 | 345/179 |
| 8,783,669 B2 * | 7/2014 | Lin | G06F 3/03545 | 178/19.01 |
| 9,019,693 B2 * | 4/2015 | Tseng | G06F 1/1616 | 16/354 |
| 9,372,565 B2 * | 6/2016 | Calub | G06F 3/016 | |
| 9,430,074 B2 * | 8/2016 | Calub | G06F 3/016 | |
| 2006/0257196 A1 * | 11/2006 | Liu | B43K 23/001 | 401/88 |
| 2009/0050378 A1 * | 2/2009 | Lee | G06F 1/1626 | 178/19.01 |
| 2010/0084202 A1 * | 4/2010 | Selin | G06F 3/03545 | 178/19.01 |
| 2010/0238615 A1 * | 9/2010 | Li | H04M 1/026 | 361/679.01 |
| 2011/0102979 A1 * | 5/2011 | Jinkinson | G06F 1/1616 | 361/679.01 |
| 2011/0188184 A1 * | 8/2011 | Hsu | H05K 5/00 | 361/679.01 |
| 2012/0014043 A1 * | 1/2012 | Dong | H04M 1/0283 | 361/679.01 |
| 2013/0057785 A1 * | 3/2013 | Hiratomo | H04M 1/0202 | 348/843 |
| 2013/0070397 A1 * | 3/2013 | Xie | G06F 1/1626 | 361/679.01 |
| 2015/0305173 A1 * | 10/2015 | Hamada | G06F 1/1616 | 361/679.01 |
| 2016/0018854 A1 * | 1/2016 | Yu | G06F 1/1669 | 361/679.08 |
| 2017/0239977 A1 * | 8/2017 | Yeh | B43K 29/00 | |

FOREIGN PATENT DOCUMENTS

| | | |
|---|---|---|
| TW | 577600 | 2/2004 |
| TW | 201018356 | 5/2010 |
| TW | I439886 | 6/2014 |

\* cited by examiner

ELECTRONIC ASSEMBLY

CROSS-REFERENCE TO RELATED APPLICATION

This application claims the priority benefit of U.S. provisional application Ser. No. 62/472,535, filed on Mar. 16, 2017. The entirety of the above-mentioned patent application is hereby incorporated by reference herein and made a part of this specification.

BACKGROUND OF THE INVENTION

Field of the Invention

The invention relates to an electronic assembly, and particularly relates to an electronic assembly having an electronic device and a stylus.

Description of Related Art

A commonly used electronic device such as a smart phone, a tablet or a notebook computer, etc., is generally configured with a touch screen to facilitate user's operation, and a user may select to use a finger or a stylus to perform a touch operation on the touch screen of the electronic device.

In order to meet a design trend of more convenience of electronic products, many electronic devices in the market are configured with a reserved space for receiving a stylus. However, there is no good fixation between the stylus and the electronic device, and the stylus is liable to fall out of the reserved space of the electronic device.

SUMMARY OF THE INVENTION

The invention provides an electronic assembly, where a stylus is adapted to be tightly accommodated in a reserved space of an electronic device.

The invention provides an electronic assembly including an electronic device and a stylus. The electronic device includes a housing and a first connecting element connected to the housing. The housing has a receiving groove and an opening, the opening communicating with the receiving groove, and the first connecting element is disposed around the opening. The stylus includes a sleeve and a pen rod. The sleeve has a second connecting element. The sleeve corresponds to the receiving groove, and the second connecting element is combined with the first connecting element to fix the sleeve to the housing. The pen rod is slidably disposed in the sleeve and has a first end, a second end opposite to the first end, and a third connecting element located at the first end.

In an embodiment of the invention, the sleeve sleeves the second end, and the first end is positioned in the receiving groove, and by exerting a force to the second end, the pen rod is slid relative to the sleeve, and the first end is moved out of the receiving groove. When the first end is moved to pass through the sleeve, a combination between the second connecting element and the first connecting element is released, and the second connecting element and the third connecting element are combined to make the sleeve to sleeve on the first end.

In an embodiment of the invention, the first connecting element includes a first magnetic portion, the second connecting element includes a second magnetic portion corresponding to the first magnetic portion, and the second magnetic portion and the first magnetic portion are magnetically attracted to fix the sleeve to the housing.

In an embodiment of the invention, the sleeve has a third end and a fourth end opposite to each other, the second magnetic portion is disposed at the third end, and the third end leans around the opening.

In an embodiment of the invention, the pen rod includes a stop portion located on the second end, the third end and the stop portion are respectively located at two opposite sides of the fourth end, and the stop portion is used for limiting a sliding stroke of the sleeve on the pen rod.

In an embodiment of the invention, an outer diameter of the stop portion is greater than an inner diameter of the fourth end of the sleeve.

In an embodiment of the invention, the electronic device further includes a third magnetic portion disposed corresponding to the receiving groove, the pen rod includes a fourth magnetic portion corresponding to the third magnetic portion, and the fourth magnetic portion is disposed at the first end, when the sleeve sleeves the second end, and the first end is located in the receiving groove, the fourth magnetic portion and the third magnetic portion are magnetically attracted to position the first end in the receiving groove.

In an embodiment of the invention, the sleeve includes a fifth magnetic portion corresponding to the third magnetic portion, and when the first end is moved to pass through the sleeve, a magnetic attraction between the fourth magnetic portion and the third magnetic portion is released, and the fourth magnetic portion and the fifth magnetic portion are magnetically attracted, such that the sleeve sleeves the first end.

In an embodiment of the invention, the sleeve includes a tube body and a pressing element, the pen rod is slidably disposed in the tube body, and the pressing element is movably disposed on the tube body.

In an embodiment of the invention, the second connecting element further includes a first position limiting portion connected to the pressing element and facing the pen rod, the third connecting element includes a second position limiting portion corresponding to the first position limiting portion, where when the first end is moved to pass through the tube body, the first position limiting portion and the second position limiting portion are combined, such that the sleeve sleeves the first end.

In an embodiment of the invention, the pressing element includes a contact portion facing the pen rod, and the pen rod includes a sensing portion corresponding to the contact portion, when the tube body sleeves the first end, and the contact portion corresponds to the sensing portion, the sensing portion is used for detecting a motion of the pressing element.

In an embodiment of the invention, the first connecting element includes a first engaging portion, the second connecting element includes a second engaging portion corresponding to the first engaging portion, and the second engaging portion and the first engaging portion are engaged to each other to fix the sleeve to the housing.

In an embodiment of the invention, the third connecting element includes a third engaging portion corresponding to the second engaging portion, and when the first end is moved to pass through the sleeve, an engagement between the second engaging portion and the first engaging portion is released, and the second engaging portion and the third engaging portion are engaged to each other to make the sleeve to sleeve on the first end.

In an embodiment of the invention, the first engaging portion includes a first locking slot, the second engaging portion includes a locking hook, a first protrusion and a second protrusion, and the locking hook and the second protrusion are respectively located at two opposite sides of the first protrusion, the third engaging portion includes a second locking slot corresponding to the locking hook and the first protrusion and a third protrusion corresponding to the second protrusion, when the pen rod is moved to pass through the sleeve, the third protrusion pushes the first protrusion, and the first protrusion drives the locking hook to move out of the first locking slot, such that engagement between the locking hook and the first locking slot is released, and when the locking hook and the first protrusion are moved to pass through the second locking slot, and the third protrusion leans against the second protrusion, the locking hook and the first protrusion move into the second locking slot to make the sleeve to sleeve on the first end.

In an embodiment of the invention, the sleeve has a third end and a fourth end opposite to each other, the second engaging portion is disposed at the third end, and the third end leans around the opening.

In an embodiment of the invention, the pen rod includes a sensing portion disposed at the first end, when the tube body sleeves the first end, and the pressing element corresponds to the sensing portion, the sensing portion is used for detecting a motion of the pressing element.

Based on the above description, in the electronic assembly of the invention, the stylus may be tightly accommodated in a receiving groove of the electronic device through a combination and fixing manner. Moreover, when the stylus is accommodated in the receiving groove, the stylus occupies less space, which avails light and thinning of the electronic device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
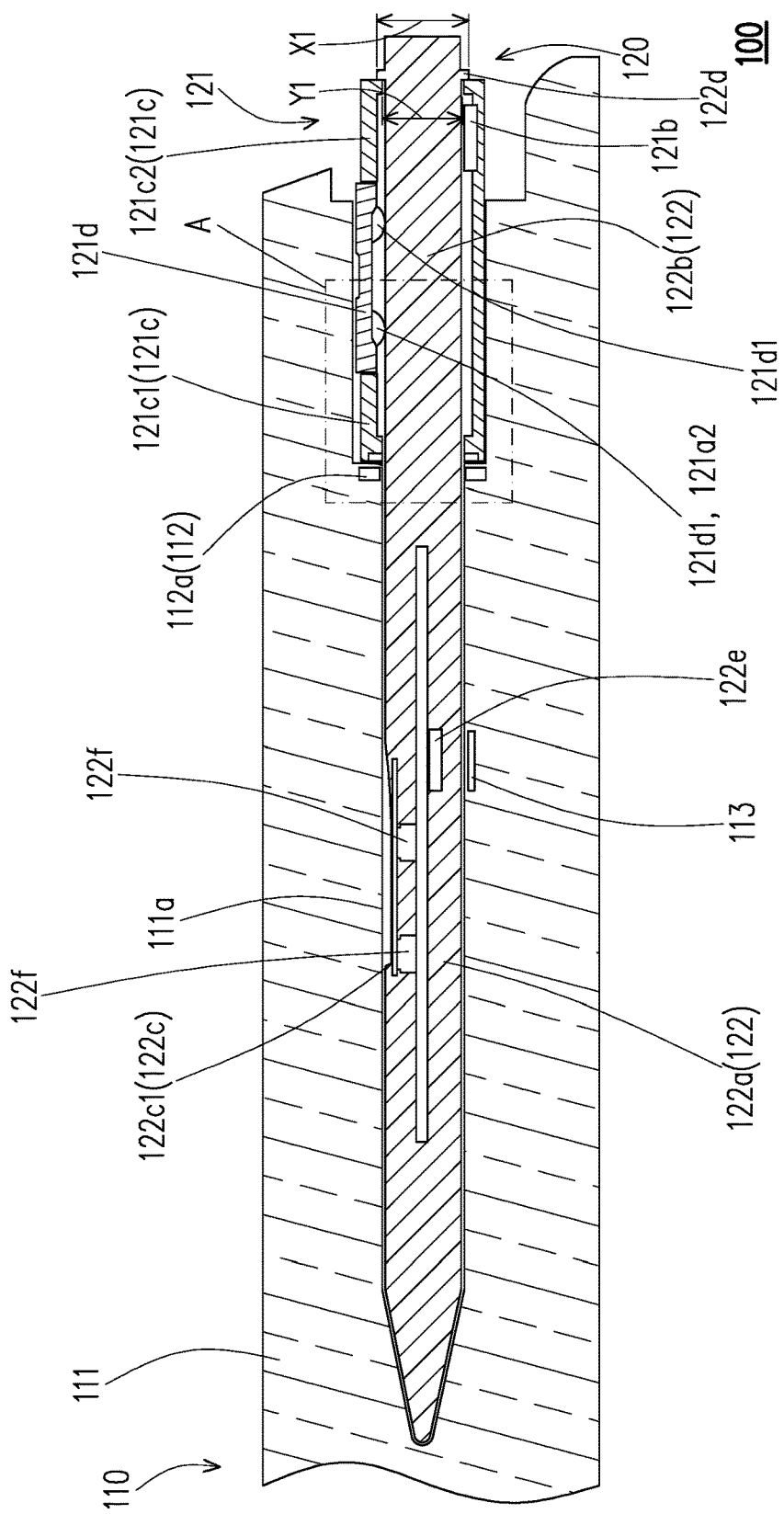
FIG. 1 is a schematic view of an electronic assembly according to an embodiment of the invention.
Figure 2:
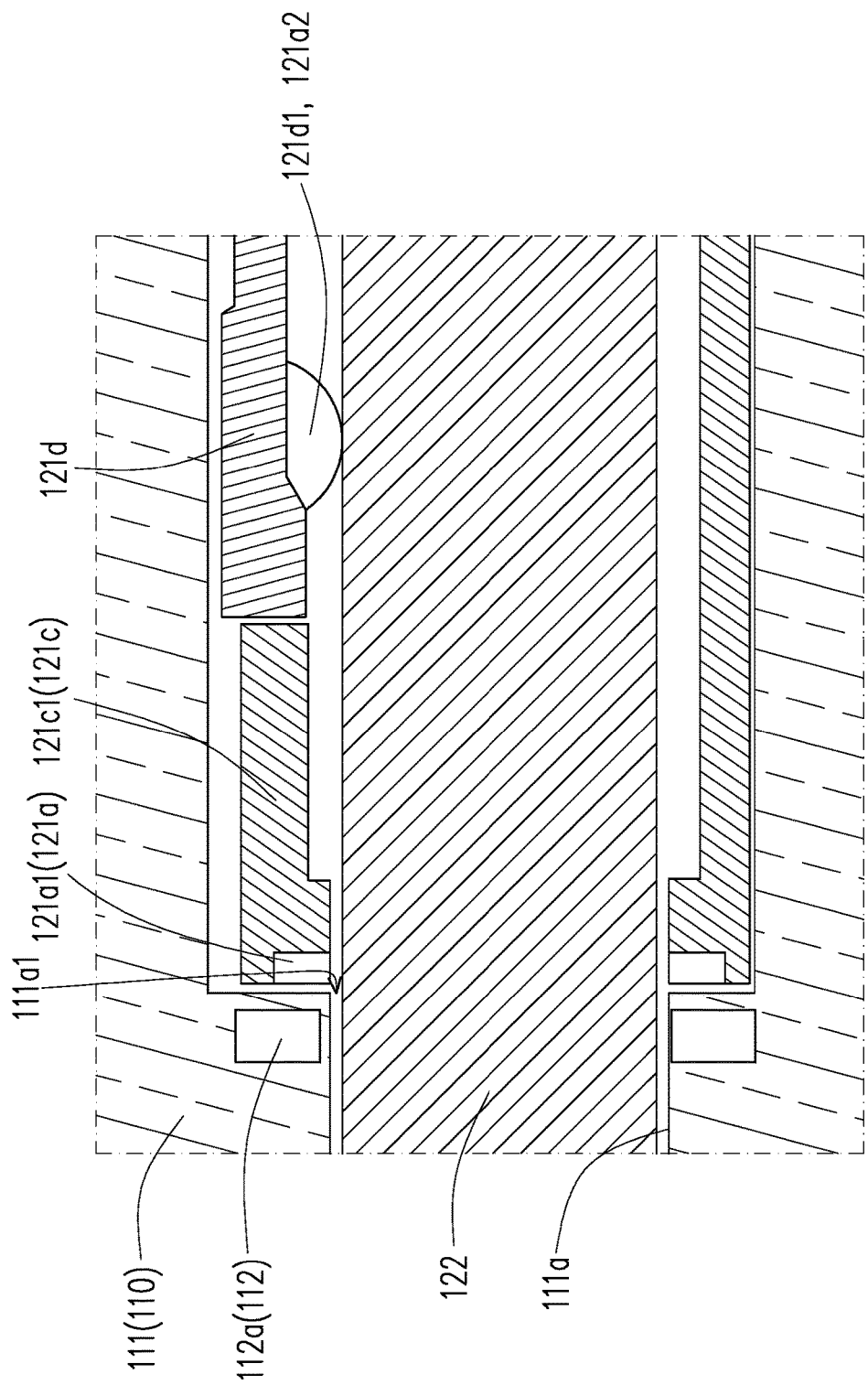
FIG. 2 is an enlarged view of a region A of FIG. 1.
Figure 3:
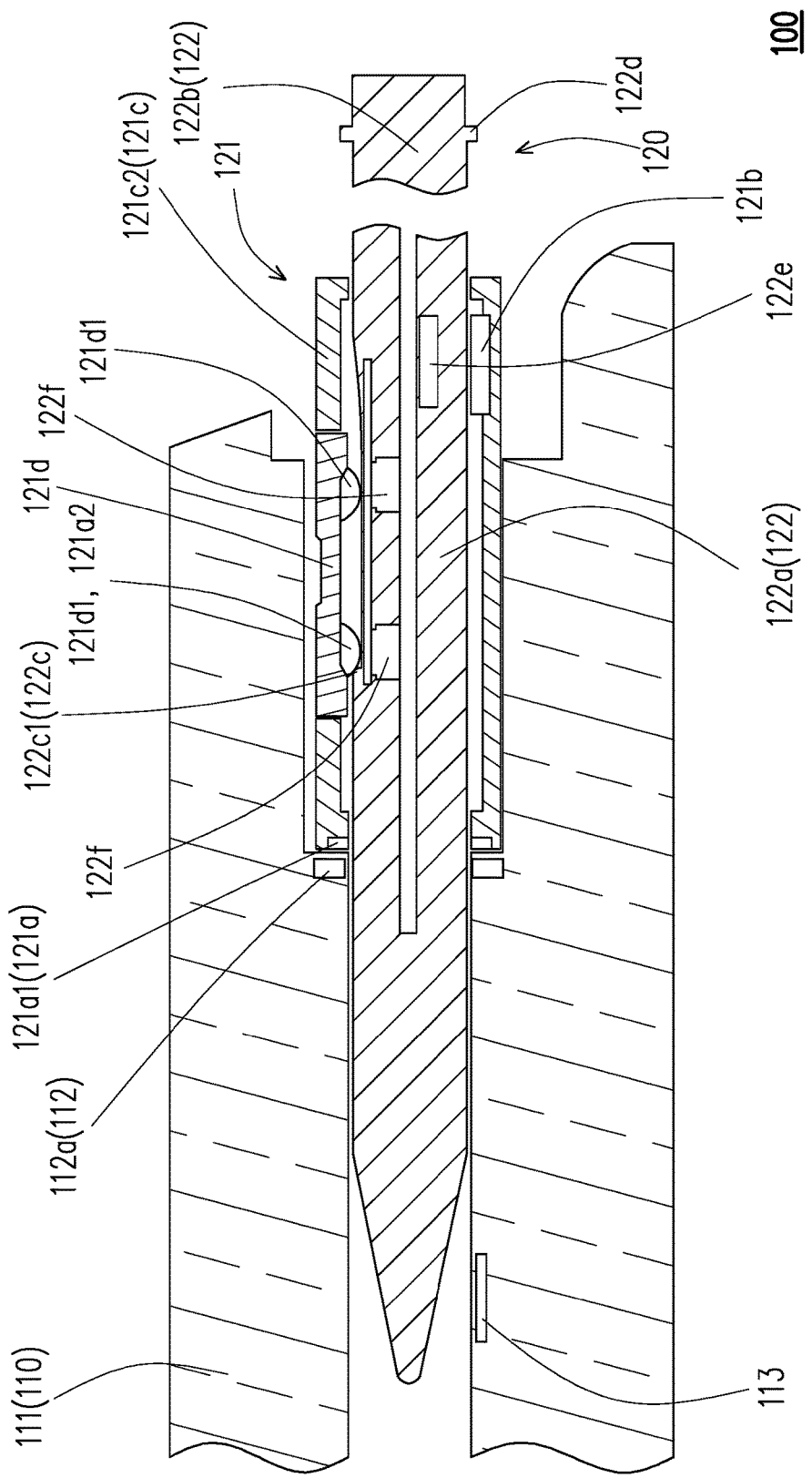
FIG. 3 is a schematic view illustrating a situation after a pen rod of a stylus of FIG. 1 is forced to move relative to a sleeve.

FIG. 1 is a schematic view of an electronic assembly according to an embodiment of the invention. FIG. 2 is an enlarged view of a region A of FIG. 1. FIG. 3 is a schematic view illustrating a situation after a pen rod of a stylus of FIG. 1 is forced to move relative to a sleeve. For clarity and simplicity's sake, in FIG. 1 and FIG. 3, a housing 111 of an electronic device 110 is illustrated in a truncated manner, and in FIG. 3, the pen rod 122 of the stylus 120 is illustrated in the truncated manner. Referring to FIG. 1 to FIG. 3, the electronic assembly 100 includes the electronic device 110 and the stylus 120. The electronic device 110 includes the housing 111 and a first connecting element 112 connected to the housing 111. The housing 111 has a receiving groove 111a and an opening 111a1, the opening 111a1 communicating with the receiving groove 111a, and the first connecting element 112 is disposed around the opening Mal. The stylus 120 includes a sleeve 121 and a pen rod 122. The sleeve 121 has a second connecting element 121a. The sleeve 121 corresponds to the receiving groove 111a of the electronic device 110 located in the housing 111, and the second connecting element 121a is combined with the first connecting element 112 to fix the sleeve 121 to the housing 111 of the electronic device 110. The pen rod 122 is slidably disposed in the sleeve 121, and the pen rod 122 has a first end 122a, a second end 122b opposite to the first end 122a, and a third connecting element 122c located at the first end 122a. The sleeve 121 sleeves the second end 122b, and the first end 122a is positioned in the receiving groove 111a of the electronic device 110 located in the housing 111, by exerting a force to the second end 122b of the pen rod 122, the pen rod 122 is slid relative to the sleeve 121, and the first end 122a of the pen rod 122 is moved out of the receiving groove 111a of the electronic device 110 located in the housing 111. When the first end 122a of the pen rod 122 is moved to pass through the sleeve 121, the combination between the second connecting element 121a of the sleeve 121 and the first connecting element 112 of the electronic device 110 located at the housing 111 is released, and the second connecting element 121a of the sleeve 121 is combined with the third connecting element 122c of the pen rod 122 to make the sleeve 121 to sleeve on the first end 122a of the pen rod 122. In this way, in the electronic assembly 100 of the present invention, the stylus 120 may be tightly accommodated in the receiving groove 111a of the electronic device 100 through the combination of the second connecting element 121a and the first connecting element 112. Moreover, when the first end 122a of the pen rod 122 of the stylus 120 is positioned in the receiving groove 111a, and the sleeve 121 sleeves the second end 122b of the pen rod 122, a fourth end 121c2 of the sleeve 121 is exposed out of the electronic device 110, so that the pen rod 122 occupies less space of the electronic device 110, which avails light and thinning of the electronic device 110. Moreover, when the user pulls the stylus 120 out of the electronic device 110, the sleeve 121 is moved from the second end 122b of the pen rod 122 to the first end 122a of the pen rod 122, and now the sleeve 121 may be tightly fixed to the first end 122a of the pen rod 122 through the combination between the second connecting element 121a and the first connecting element 112, such that when the user holds the stylus 120 through the sleeve 121, the user may have a better holding feeling.

In detail, referring to FIG. 1 and FIG. 2, the first connecting element 112 of the electronic device 110 includes a first magnetic portion 112a, the second connecting element 121a of the sleeve 121 includes a second magnetic portion 121a1 corresponding to the first magnetic portion 112a, and the second magnetic portion 121a1 and the first magnetic portion 112a of the electronic device 110 located in the housing 111 are magnetically attracted to fix the sleeve 121 to the housing 111. The electronic device 110 further includes a third magnetic portion 113 disposed corresponding to the receiving groove 111a, and the pen rod 122 includes a fourth magnetic portion 122e corresponding to the third magnetic portion 113, and the fourth magnetic portion 122e is disposed at the first end 122a of the pen rod 122. When the sleeve 121 sleeves the second end 122b of the pen rod 122, and when the first end 122a of the pen rod 122 is located in the receiving groove 111a, the fourth magnetic portion 122e and the third magnetic portion 113 in the housing 111 are magnetically attracted to position the first end 122a of the pen rod 122 in the receiving groove 111a of the housing 111.

In the present embodiment, the first magnetic portion 112a and the third magnetic portion 113 are embedded in the housing 111 of the electronic device 110, though in other embodiments, the first magnetic portion and the third magnetic portion may also be disposed in coplanar with an inner wall surface of the receiving groove, and as long as the first magnetic portion and the third magnetic portion do not obstruct the movement of the first end of the pen rod in the receiving groove, and the first magnetic portion and the second magnetic portion may magnetically attract each other, and the third magnetic portion and the fourth magnetic portion may magnetically attract each other, configuration positions of the first magnetic portion and the third magnetic portion are not limited by the invention.

In the present embodiment, the sleeve 121 includes a tube body 121c and a pressing element 121d, the pen rod 122 is slidably disposed in the tube body 121c of the sleeve 121, and the pressing element 121d is movably disposed on the tube body 121c. The tube body 121c of the sleeve 121 has a third end 121c1 and a fourth end 121c2 opposite to each other, the second magnetic portion 121a1 is disposed at the third end 121c1 of the tube body 121c, and the third end 121c1 leans around the opening 111a1.

In the present embodiment, the second magnetic portion 121a1 is disposed at a front end of the third end 121c1 of the tube body 121c, though in other embodiments, the second magnetic portion may also be disposed in the tube body to face the pen rod, and may be disposed on a surface of the tube body exposed outside, and as long as the second magnetic portion and the first magnetic portion may magnetically attract each other, the configuration position of the second magnetic portion is not limited by the invention.

On the other hand, the pen rod 122 includes a stop portion 122d located on the second end 122b, the third end 121c1 of the tube body 121c and the stop portion 122d are respectively located at two opposite sides of the fourth end 121c2 of the tube body 121c, and the stop portion 122d is used for limiting a sliding stroke of the sleeve 121 on the pen rod 122. To be specific, an outer diameter X1 of the stop portion 122d is greater than an inner diameter Y1 of the fourth end 121c2 of the tube body 121c of the sleeve 121, so as to prevent the sleeve 121 from falling out of the second end 122b of the pen rod 122.

Referring to FIG. 1 to FIG. 3, the sleeve 121 includes a fifth magnetic portion 121b corresponding to the third magnetic portion 113, the second connecting element 121a further includes a first position limiting portion 121a2, where the first position limiting portion 121a2 is connected to the pressing element 121d and faces the pen rod 122, and the third connecting element 122c includes a second position limiting portion 122c1 corresponding to the first position limiting portion 121a2. When the sleeve 121 sleeves the second end 122b of the pen rod 122, and the first end 122a of the pen rod 122 is positioned in the receiving groove 111a, by exerting a force to the second end 122b of the pen rod 122, the pen rod 122 is slid relative to the sleeve 121, and the first end 122a of the pen rod 122 is moved out of the receiving groove 111a. When the first end 122a of the pen rod 122 is moved to pass through the tube body 121c of the sleeve 121, the magnetic attraction between the second magnetic portion 121a1 and the first magnetic portion 112a is released, and the magnetic attraction between the fourth magnetic portion 122e and the third magnetic portion 113 is released, the fourth magnetic portion 122e and the fifth magnetic portion 121b are magnetically attracted, and the first position limiting portion 121a2 and the second position limiting portion 122c1 are combined, such that the sleeve 121 sleeves the first end 122a of the pen rod 122. In the present embodiment, the first position limiting portion 121a2 is a convex structure, and the second position limiting portion 122c1 is a concave structure corresponding to the first position limiting portion 121a2, though the concave-convex coordination of the first position limiting portion and the second position limiting portion may also be exchanged. In this way, when the user pulls the stylus 120 out of the electronic device 110, the sleeve 121 may be moved from the second end 122b of the pen rod 122 to the first end 122a of the pen rod 122. In this case, the sleeve 121 may be tightly fixed to the first end 122a of the pen rod 122 through the combination between the first position limiting portion 121a2 and the second position limiting portion 122c1 and the magnetic attraction between the fourth magnetic portion 122e and the fifth magnetic portion 121b, such that when the user holds the stylus 120 through the sleeve 121, the user may have a better holding feeling.

Figure 4:
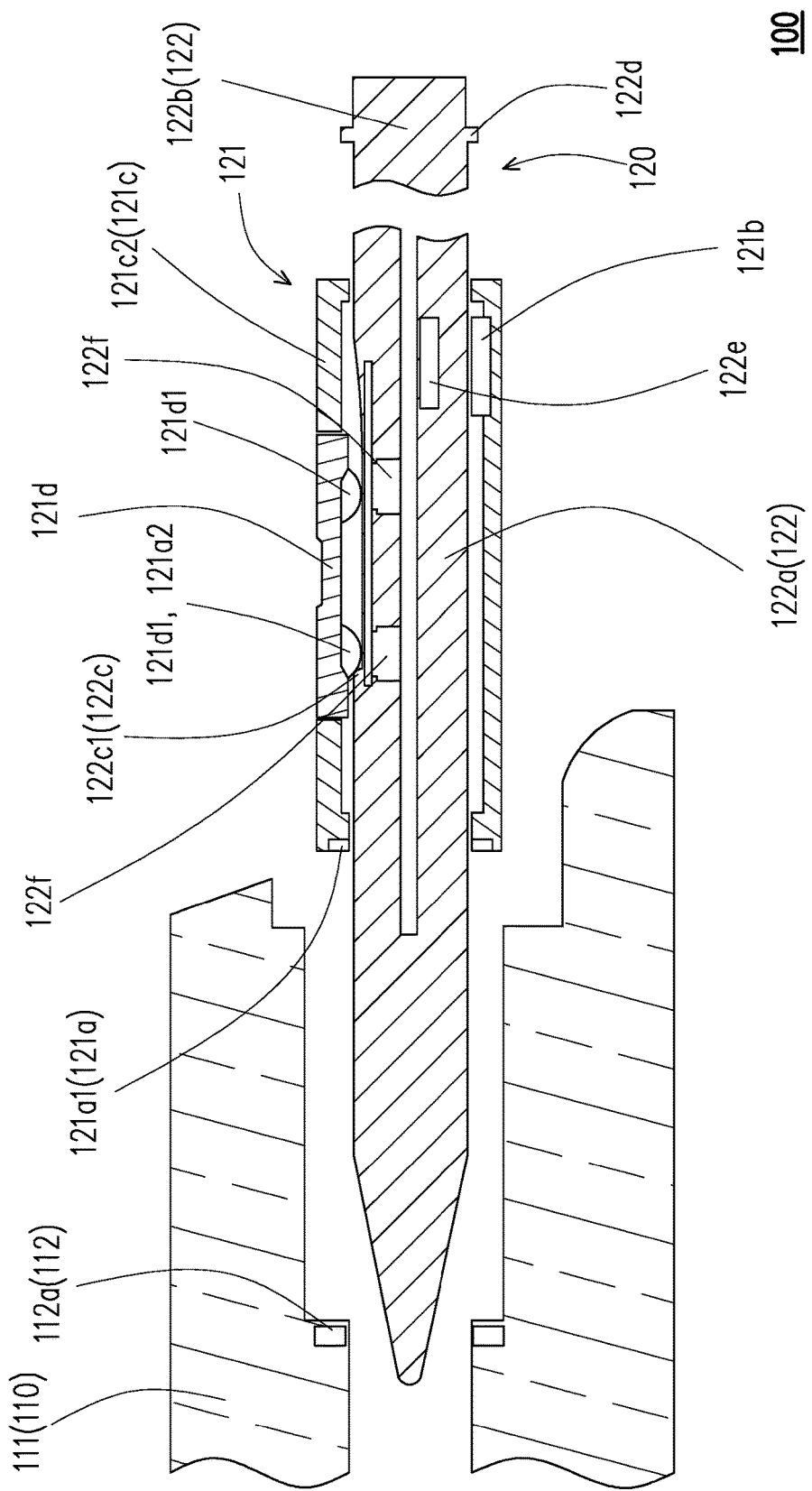
FIG. 4 is a schematic view of a situation that the stylus of FIG. 1 is moved out of a receiving groove of an electronic device.

FIG. 4 is a schematic view of a situation that the stylus of FIG. 1 is moved out of the receiving groove of the electronic device. For clarity and simplicity's sake, in FIG. 4, the housing 111 of the electronic device 110 is illustrated in the truncated manner, and the pen rod 122 of the stylus 120 is illustrated in the truncated manner. Referring to FIG. 4, the pressing element 121d includes a contact portion 121d1 facing the pen rod 122, and the pen rod 122 includes a sensing portion 122f corresponding to the contact portion 121d1. The sensing portion 122f is, for example, a pressure sensor, and when the tube body 121c sleeves the first end 122a of the pen rod 122, and the contact portion 121d1 corresponds to the sensing portion 122f, if the user presses down the pressing element 121d, the contact portion 121d1 has a corresponding movement to exert a pressure to the sensing portion 122f, and the sensing portion 122f may detect the motion of the pressing element 121d to turn on/off an inbuilt function of the stylus 120 through the pressing element 121d. It should be noted that in the present embodiment, one of the contact portions 121d1 is taken to serve as the first position limiting portion 121a2, though in other embodiments, the first position limiting portion may be other additionally configured structure.

In this way, in the electronic assembly 100 of the invention, the stylus 120 may be tightly accommodated in the receiving groove 111a of the electronic device 110 through the magnetic attraction between the second magnetic portion 121a1 and the first magnetic portion 112a and the magnetic attraction between the fourth magnetic portion 122e and the third magnetic portion 113.

Figure 5E:
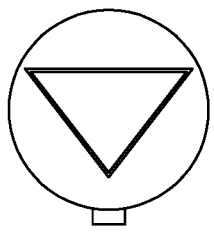
FIG. 5B to FIG. 5I are cross-sectional views of the stylus of FIG. 5A in other implementations.
Figure 5I:
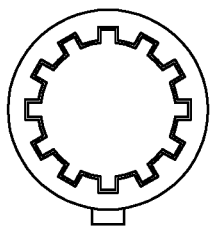
Figure 5D:
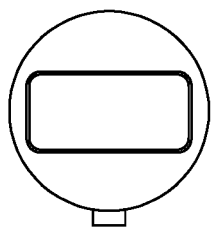
Figure 5H:
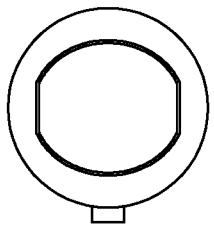
Figure 5C:
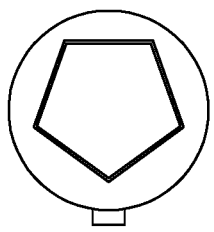
Figure 5G:
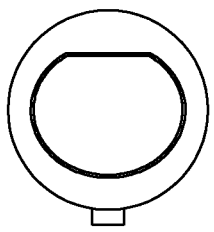
Figure 5B:
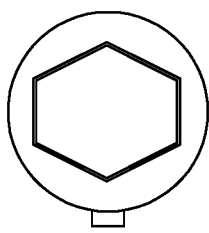
Figure 5F:
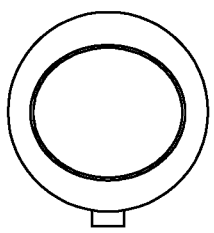
Figure 5A:
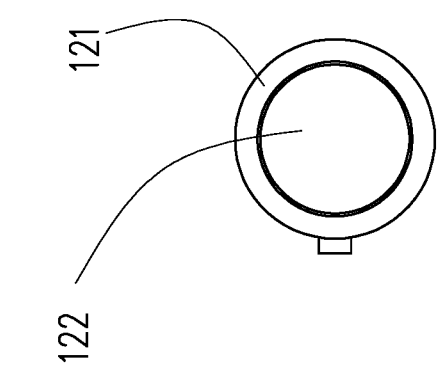
FIG. 5A is a cross-sectional view of the stylus of FIG. 1.

FIG. 5A is a cross-sectional view of the stylus of FIG. 1, FIG. 5B to FIG. 5I are cross-sectional views of the stylus of FIG. 5A in other implementations. Referring to FIG. 5A, in the present embodiment, a cross section of the pen rod 122 is a perfect circuit, and the sleeve 121 is a perfect circuit corresponding to the pen rod 122, though in other embodiments, as shown in FIG. 5B to FIG. 5I, the cross sections of the pen rod and the sleeve may have other shapes than the perfect circuits, so that when the pen rod is slid relative to the sleeve, no deflection is occurred. Referring to FIG. 1 and FIG. 5A, on the other hand, in the present embodiment, since the cross sections of the pen rod 122 and the sleeve 121 are perfect circuits, when the pen rod 122 is slid relative to the sleeve 121, the fourth magnetic portion 122e and the fifth magnetic portion 121b may provide a positioning effect to the pen rod 122 and the sleeve 121, such that the first position limiting portion 121a2 and the second position limiting portion 122c1 may be accurately aligned.

Figure 6:
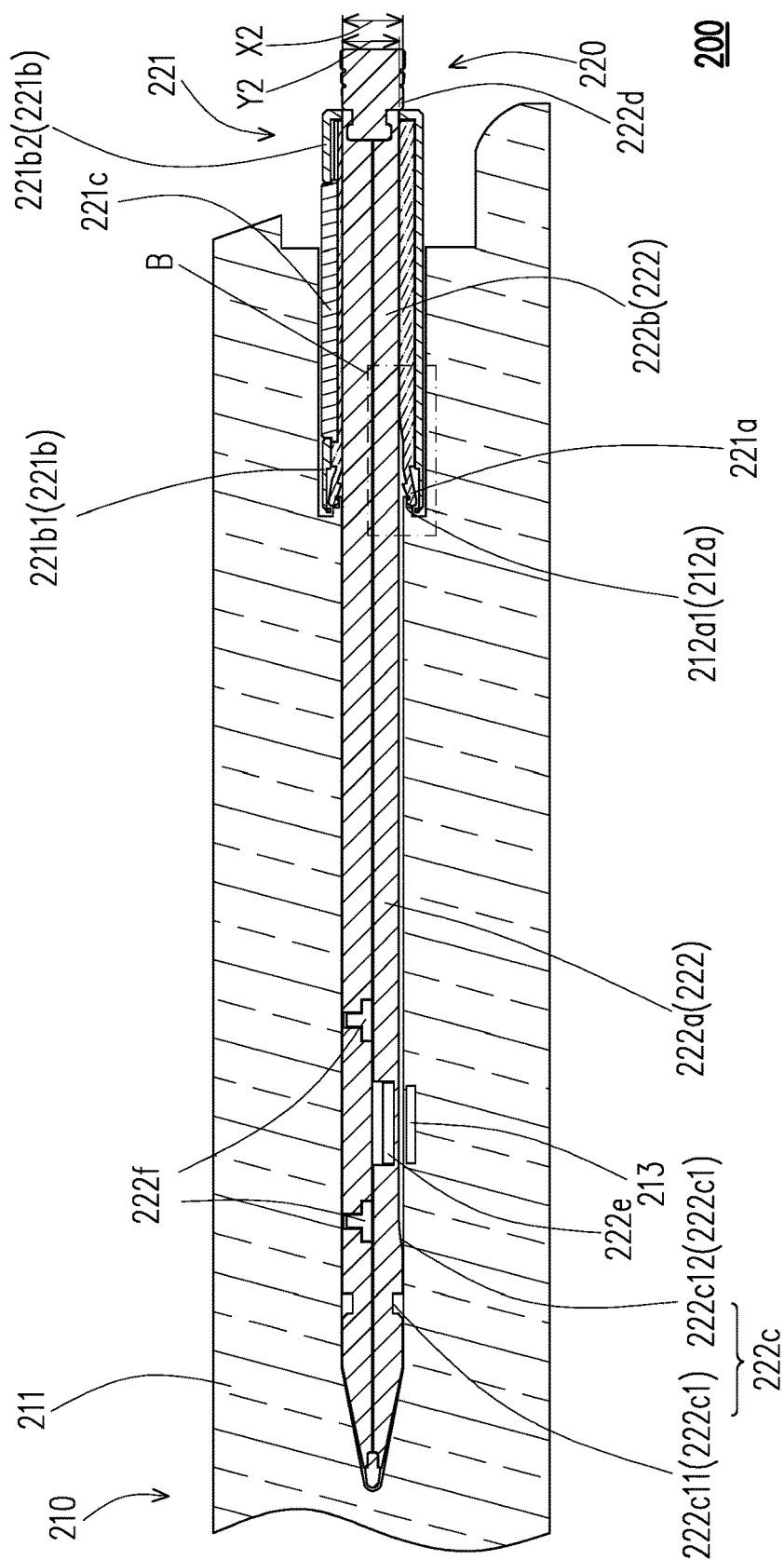
FIG. 6 is a schematic view of an electronic assembly according to another embodiment of the invention.
Figure 7:
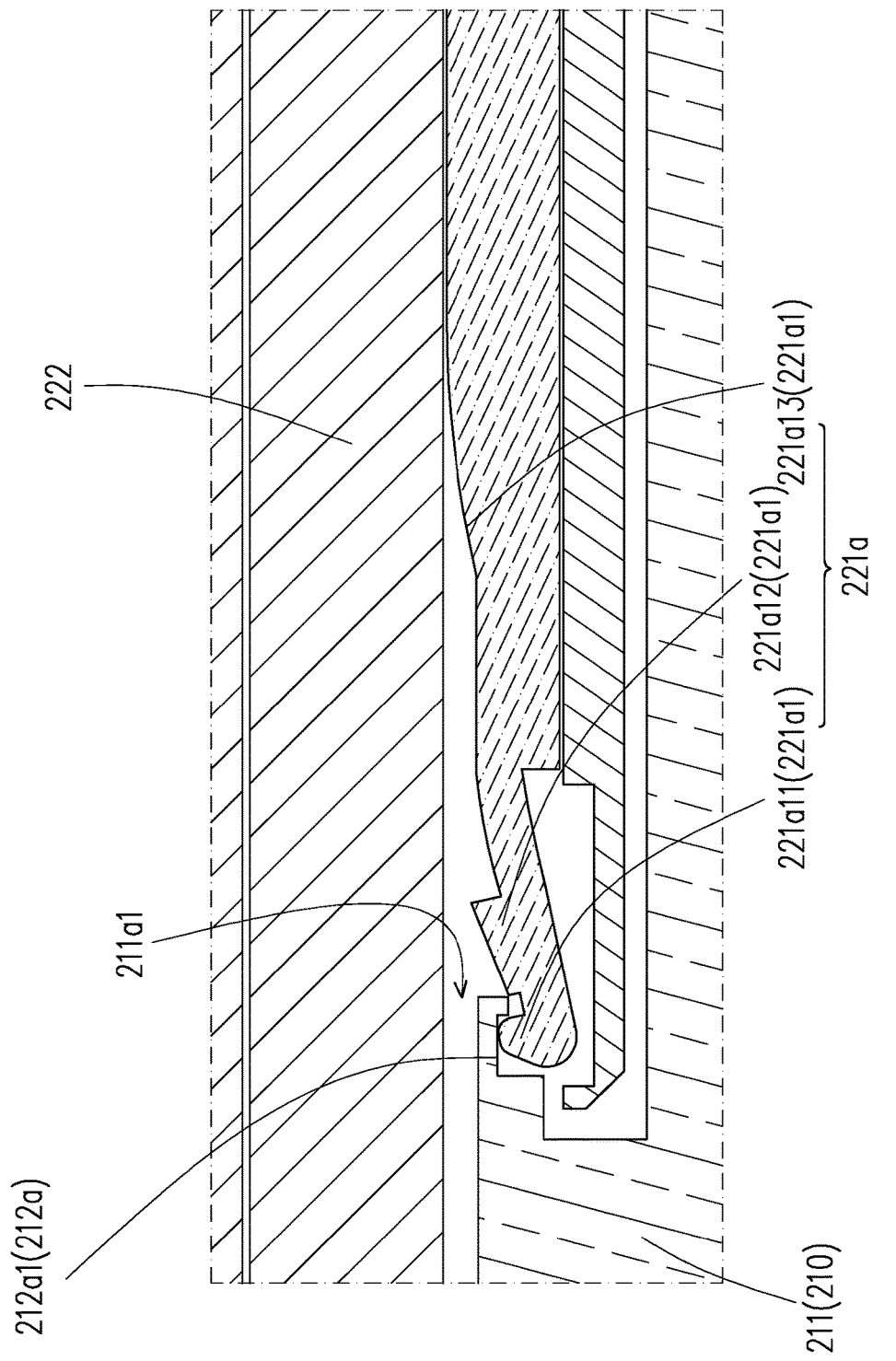
FIG. 7 is an enlarged view of a region B of FIG. 6.
Figure 8:
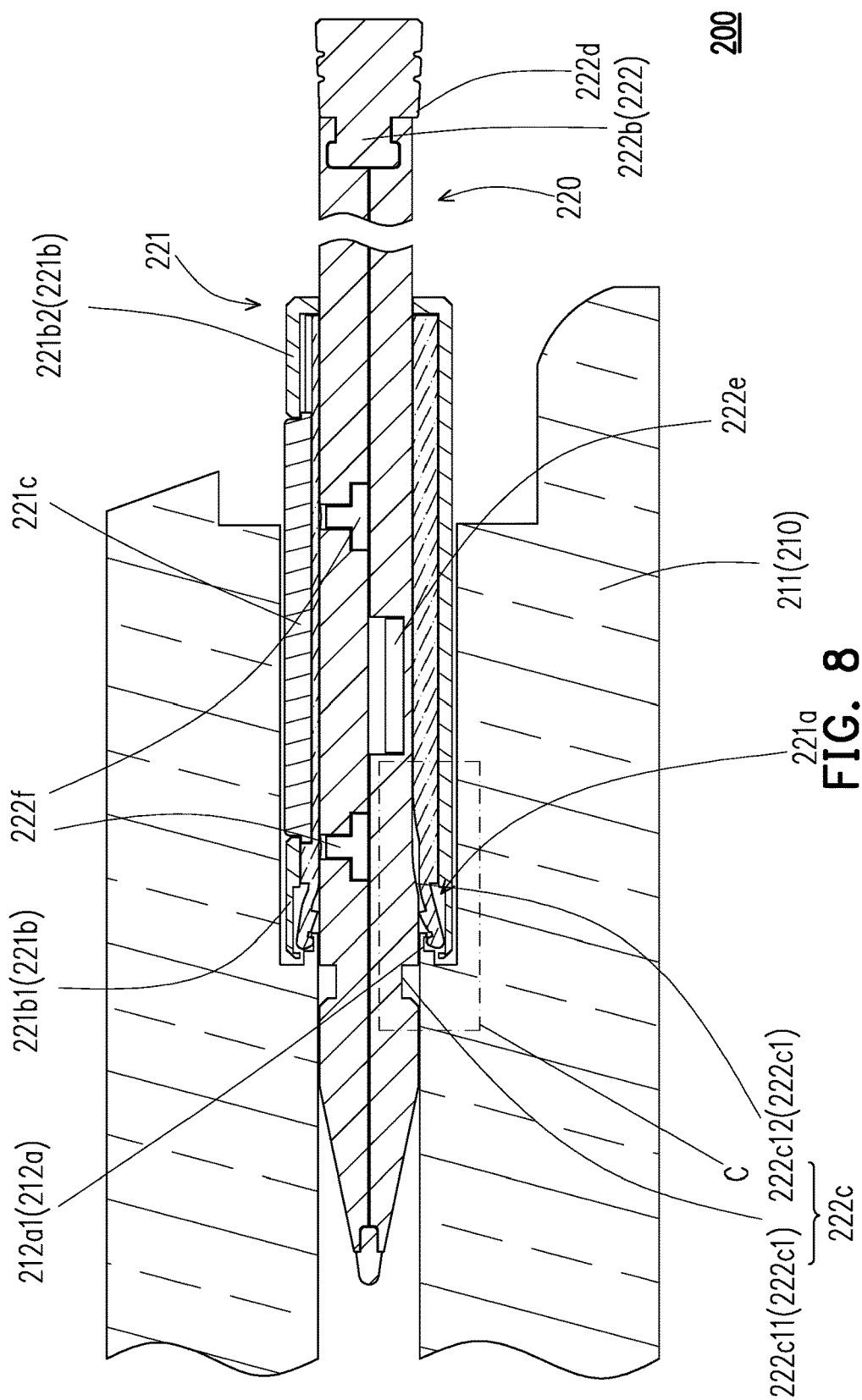
FIG. 8 is a schematic view illustrating a situation after a pen rod of a stylus of FIG. 6 is forced to move relative to a sleeve, where a combination of a second connecting element and a third connection element is released.

FIG. 6 is a schematic view of an electronic assembly according to another embodiment of the invention. FIG. 7 is an enlarged view of a region B of FIG. 6. FIG. 8 is a schematic view illustrating a situation after a pen rod of a stylus of FIG. 6 is forced to move relative to a sleeve, where the combination of the second connecting element and the third connection element is released. For clarity and simplicity's sake, in FIG. 6 and FIG. 8, a housing 211 of an electronic device 210 is illustrated in a truncated manner. Referring to FIG. 6 to FIG. 8, the electronic assembly 200 includes the electronic device 210 and the stylus 220. The electronic device 210 includes the housing 211 and a first connecting element 212 connected to the housing 211. The housing 211 has a receiving groove 211a and an opening 211a1, the opening 211a1 communicating with the receiving groove 211a, and the first connecting element 212 is disposed around the opening 211a1. The stylus 220 includes a sleeve 221 and a pen rod 222. The sleeve 221 has a second connecting element 221a, where the sleeve 221 corresponds to the receiving groove 211a of the electronic device 210 located in the housing 211, and the second connecting element 221a is combined with the first connecting element 212 to fix the sleeve 221 to the housing 211 of the electronic device 210. The pen rod 222 is slidably disposed in the sleeve 221, and the pen rod 222 has a first end 222a, a second end 222b opposite to the first end 222a, and a third connecting element 222c located at the first end 222a. The sleeve 221 sleeves the second end 222b, and the first end 222a is positioned in the receiving groove 211a of the electronic device 210 located in the housing 211. By exerting a force to the second end 222b of the pen rod 222, the pen rod 222 is slid relative to the sleeve 221, and the first end 222a of the pen rod 222 is moved out of the receiving groove 211a of the electronic device 210 located in the housing 211. When the first end 222a of the pen rod 222 is moved to pass through the sleeve 221, the combination between the second connecting element 221a of the sleeve 221 and the first connecting element 212 of the electronic device 210 located at the housing 211 is released, and the second connecting element 221a of the sleeve 221 is combined with the third connecting element 222c of the pen rod 222 to make the sleeve 221 to sleeve on the first end 222a of the pen rod 222. In this way, in the electronic assembly 200 of the present invention, the stylus 220 may be tightly accommodated in the receiving groove 211a of the electronic device 210 through the combination of the second connecting element 221a and the first connecting element 212. Moreover, when the first end 222a of the pen rod 222 of the stylus 220 is positioned in the receiving groove 211a, and the sleeve 221 sleeves the second end 222b of the pen rod 222, a fourth end 221b2 of the sleeve 221 is exposed out of the electronic device 210, so that the pen rod 222 occupies less space of the electronic device 210, which avails light and thinning of the electronic device 210. Moreover, when the user pulls the stylus 220 out of the electronic device 210, the sleeve 221 is moved from the second end 222b of the pen rod 222 to the first end 222a of the pen rod 222, and now the sleeve 221 may be tightly fixed to the first end 222a of the pen rod 222 through the combination between the second connecting element 221a and the first connecting element 212, such that when the user holds the stylus 220 through the sleeve 221, the user may have a better holding feeling.

In detail, In detail, referring to FIG. 6 and FIG. 7, the first connecting element 212 of the electronic device 210 includes a first engaging portion 212a, the second connecting element 221a of the sleeve 221 includes a second engaging portion 221a1 corresponding to the first magnetic portion 212a, and the second engaging portion 221a1 and the first engaging portion 212a of the electronic device 210 located in the housing 211 are engaged to fix the sleeve 221 to the housing 211. The electronic device 210 further includes a third magnetic portion 213 disposed corresponding to the receiving groove 211a, and the pen rod 222 includes a fourth magnetic portion 222e corresponding to the third magnetic portion 213, and the fourth magnetic portion 222e is disposed at the first end 222a of the pen rod 222. When the sleeve 221 sleeves the second end 222b of the pen rod 222, and when the first end 222a of the pen rod 222 is located in the receiving groove 211a, the fourth magnetic portion 222e and the third magnetic portion 213 in the housing 211 are magnetically attracted to position the first end 222a of the pen rod 222 in the receiving groove 211a of the housing 211.

In the present embodiment, the third magnetic portion 213 is embedded in the housing 211 of the electronic device 210, though in other embodiments, the third magnetic portion may also be disposed in coplanar with an inner wall surface of the receiving groove, and as long as the third magnetic portion does not obstruct the movement of the first end of the pen rod in the receiving groove, and the third magnetic portion and the fourth magnetic portion may magnetically attract each other, configuration position of the third magnetic portion is not limited by the invention.

In the present embodiment, the sleeve 221 includes a tube body 221b and a pressing element 221c, the pen rod 222 is slidably disposed in the tube body 221b of the sleeve 221, and the pressing element 221c is movably disposed on the tube body 221b. The tube body 221b of the sleeve 221 has a third end 221b1 and a fourth end 221b2 opposite to each other, the second engaging portion 221a1 is disposed at the third end 221b1 of the tube body 221b, and the third end 221b1 leans around the opening 211a1.

On the other hand, the pen rod 222 includes a stop portion 222d located on the second end 222b, the third end 221b1 of the tube body 221b and the stop portion 222d are respectively located at two opposite sides of the fourth end 221b2 of the tube body 221b, and the stop portion 222d is used for limiting a sliding stroke of the sleeve 221 on the pen rod 222. To be specific, an outer diameter X2 of the stop portion 222d is greater than an inner diameter Y2 of the fourth end 221b2 of the tube body 221b of the sleeve 221, so as to prevent the sleeve 221 from falling out of the second end 222b of the pen rod 222.

Figure 9:
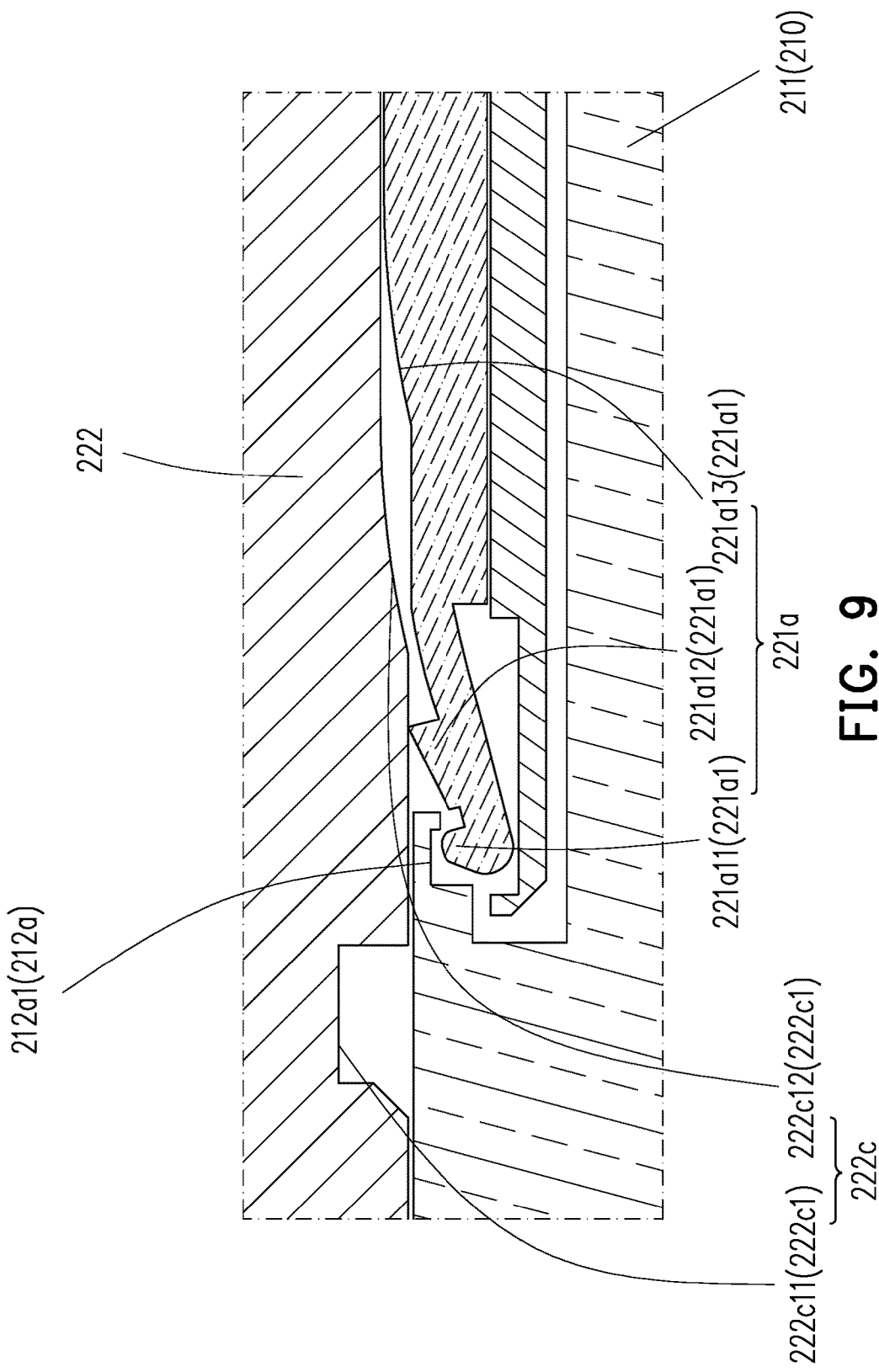
FIG. 9 is an enlarged view of a region C of FIG. 8.

FIG. 9 is an enlarged view of a region C of FIG. 8. Referring to FIG. 6, FIG. 7 and FIG. 9, the third connecting element 222c includes a third engaging portion 222c1 corresponding to the second engaging portion 221a1, and when the first end 222a of the pen rod 222 is moved to pass through the sleeve 221, the combination between the second engaging portion 221a1 and the first engaging portion 212a is released, and the second engaging portion 221a1 is engaged to the third engaging portion 222c1, such that the sleeve 221 sleeves the first end 222a of the pen rod 222.

Further, the first engaging portion 212a includes a first locking slot 212a1, the second engaging portion 221a1 includes a locking hook 221a11, a first protrusion 221a12 and a second protrusion 221a13, and the locking hook 221a11 and the second protrusion 221a13 are respectively located at two opposite sides of the first protrusion 221a12, and the third engaging portion 222c1 includes a second locking slot 222c11 corresponding to the locking hook 221a11 and the first protrusion 221a12 and a third protrusion 222c12 corresponding to the second protrusion 221a13.

Figure 10:
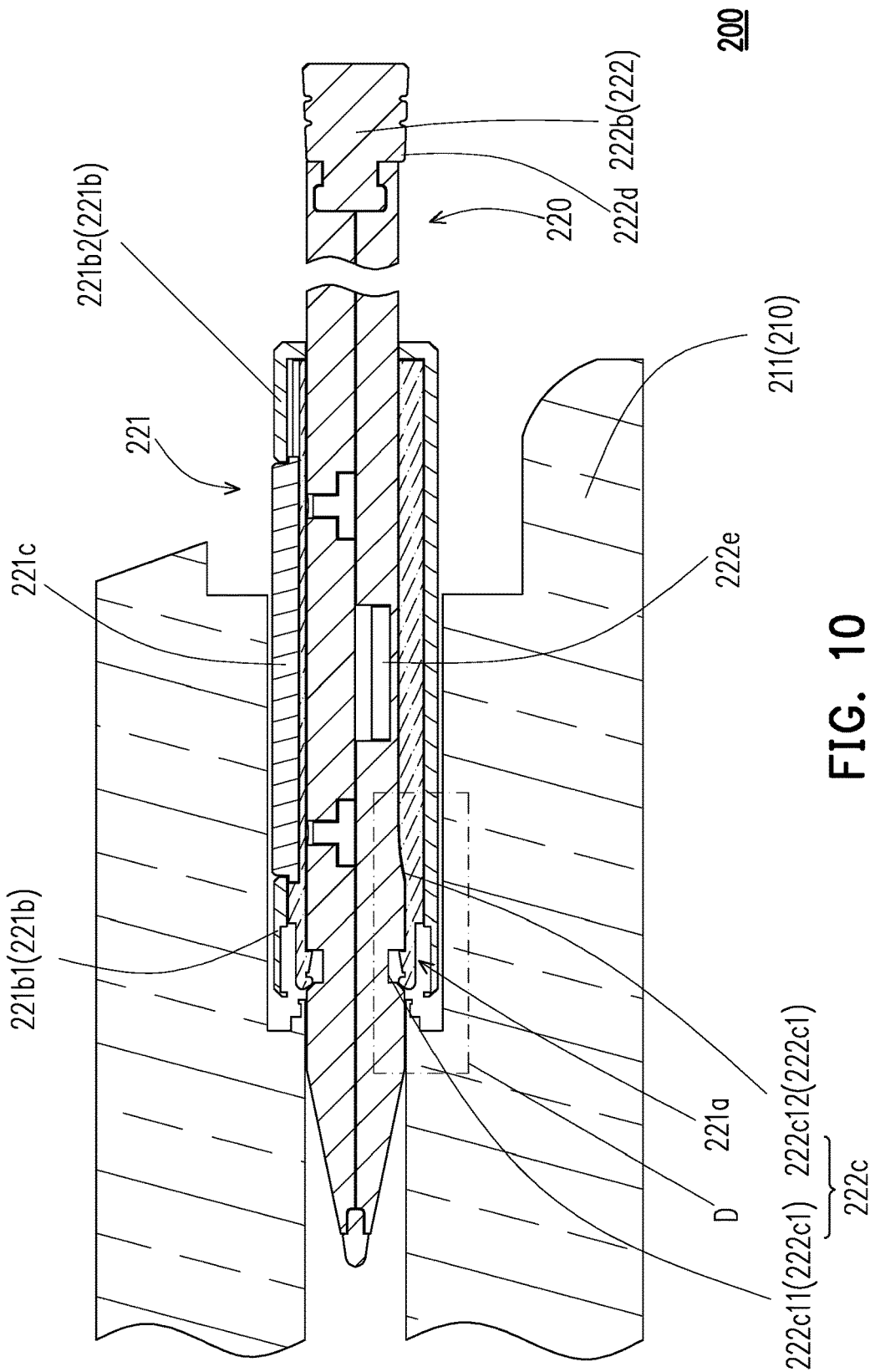
FIG. 10 is a schematic view illustrating a situation after the pen rod of the stylus of FIG. 6 is forced to move relative to the sleeve, where the second combination element is combined with the third combination element.
Figure 11:
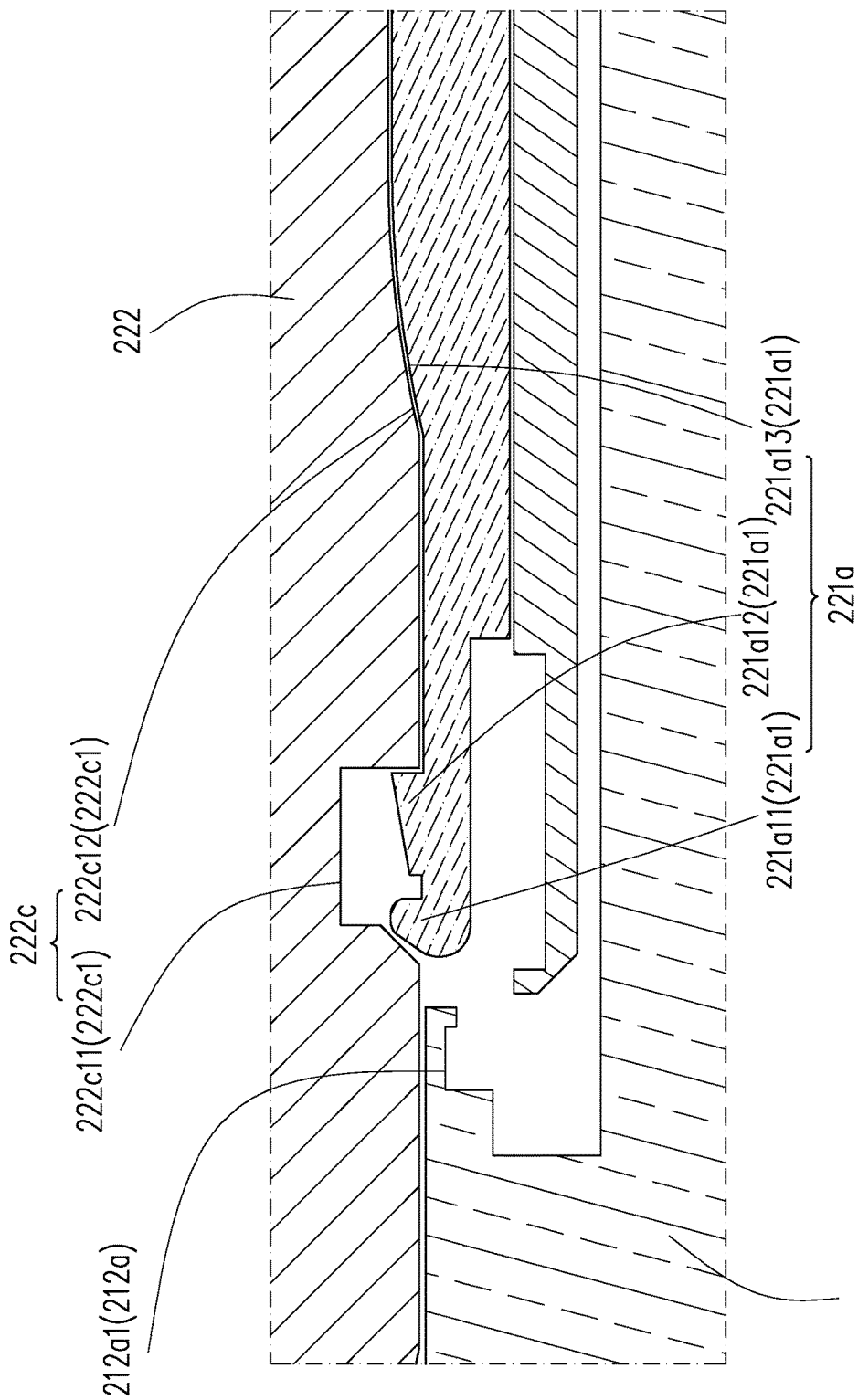
FIG. 11 is an enlarged view of a region D of FIG. 10.

FIG. 10 is a schematic view illustrating a situation after the pen rod of the stylus of FIG. 6 is forced to move relative to the sleeve, where the second combination element is combined with the third combination element. For clarity and simplicity's sake, in FIG. 10, the housing 211 of the electronic device 210 is illustrated in the truncated manner, the pen rod 222 of the stylus 220 is illustrated in the truncated manner. FIG. 11 is an enlarged view of a region D of FIG. 10. As shown in FIG. 6 and FIG. 7, when the sleeve 221 sleeves the second end 222b of the pen rod 222, and the first end 222a of the pen rod 222 is positioned in the receiving groove 211a. By exerting a force to the second end 222b of the pen rod 222, the pen rod 222 is slid relative to the sleeve 221, and the first end 222a of the pen rod 222 is moved out of the receiving groove 211a. As shown in FIG. 8 and FIG. 9, when the pen rod 222 is moved to pass through the sleeve 221, the third protrusion 222c12 pushes the first protrusion 221a12, and the first protrusion 221a12 drives the locking hook 221a11 to move out of the first locking slot 212a1, such that the engagement of the locking hook 221a11 and the first locking slot 212a1 is released. As shown in FIG. 10 and FIG. 11, when the locking hook 221a11 and the first protrusion 221a12 are moved to pass through the second locking slot 222c11, and the third protrusion 222c12 is leaned against the second protrusion 221a13, the locking hook 221a11 and the first protrusion 221a12 are moved into the second locking slot 222c11, such that the sleeve 221 sleeves the first end 222a of the pen rod 222. In this way, when the user pulls the stylus 220 out of the electronic device 210, the sleeve 221 is moved from the second end 222b of the pen rod 222 to the first end 222a of the pen rod 222, and now the sleeve 221 may be tightly fixed to the first end 222a of the pen rod 222 through the engagement between the second engaging portion 221a1 and the third engaging portion 222c1, such that when the user holds the stylus 220 through the sleeve 221, the user may have a better holding feeling.

Referring to FIG. 6 and FIG. 10, the pen rod 222 includes a sensing portion 222f disposed at the first end 222a. The sensing portion 222f is, for example, a displacement sensor. When the tube body 221b sleeves the first end 222a of the pen rod 222, and the pressing element 221c corresponds to the sensing portion 222f, if the user presses down the pressing element 221c, the sensing portion 222f may detect the motion of the pressing element 221c to turn on/off an inbuilt function of the stylus 220 through the pressing element 221c.

In summary, in the electronic assembly of the invention, the stylus may be tightly accommodated in a receiving groove of the electronic device through a combination between the first connecting element and the second connecting element. Moreover, when the first end of the pen rod of the stylus is positioned in the receiving groove, and the sleeve sleeves the second end of the pen rod, the fourth end of the sleeve is exposed out of the electronic device, so that the pen rod occupies less space of the electronic device, which avails light and thinning of the electronic device. In addition, when the user pulls the stylus out of the electronic device, the sleeve is moved from the second end of the pen rod to the first end of the pen rod, and now the sleeve may be tightly fixed to the first end of the pen rod through the combination between the second connecting element and the first connecting element, such that when the user holds the stylus through the sleeve, the user may have a better holding feeling.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic assembly, comprising:
an electronic device, comprising a housing and a first connecting element connected to the housing, wherein the housing has a receiving groove and an opening, the opening communicating with the receiving groove, and the first connecting element is disposed around the opening; and
a stylus, comprising:
a sleeve, having a second connecting element, wherein the sleeve corresponds to the receiving groove, and the second connecting element is combined with the first connecting element to fix the sleeve to the housing; and
a pen rod, slidably disposed in the sleeve, and having a first end, a second end opposite to the first end, and a third connecting element located at the first end.

2. The electronic assembly as claimed in claim 1, wherein the sleeve sleeves the second end, and the first end is positioned in the receiving groove, and by exerting a force to the second end, the pen rod is slid relative to the sleeve, and the first end is moved out of the receiving groove, when the first end is moved to pass through the sleeve, a combination between the second connecting element and the first connecting element is released, and the second connecting element and the third connecting element are combined to make the sleeve to sleeve on the first end.

3. The electronic assembly as claimed in claim 1, wherein the first connecting element comprises a first magnetic portion, the second connecting element comprises a second magnetic portion corresponding to the first magnetic portion, and the second magnetic portion and the first magnetic portion are magnetically attracted to fix the sleeve to the housing.

4. The electronic assembly as claimed in claim 3, wherein the sleeve has a third end and a fourth end opposite to each other, the second magnetic portion is disposed at the third end, and the third end leans around the opening.

5. The electronic assembly as claimed in claim 4, wherein the pen rod comprises a stop portion located on the second end, the third end and the stop portion are respectively located at two opposite sides of the fourth end, and the stop portion is used for limiting a sliding stroke of the sleeve on the pen rod.

6. The electronic assembly as claimed in claim 5, wherein an outer diameter of the stop portion is greater than an inner diameter of the fourth end of the sleeve.

7. The electronic assembly as claimed in claim 3, wherein the electronic device further comprises a third magnetic portion disposed corresponding to the receiving groove, the pen rod comprises a fourth magnetic portion corresponding to the third magnetic portion, and the fourth magnetic portion is disposed at the first end, when the sleeve sleeves the second end, and the first end is located in the receiving groove, the fourth magnetic portion and the third magnetic portion are magnetically attracted to position the first end in the receiving groove.

8. The electronic assembly as claimed in claim 7, wherein the sleeve comprises a fifth magnetic portion corresponding to the third magnetic portion, and when the first end is moved to pass through the sleeve, a magnetic attraction between the fourth magnetic portion and the third magnetic portion is released, and the fourth magnetic portion and the fifth magnetic portion are magnetically attracted, such that the sleeve sleeves the first end.

9. The electronic assembly as claimed in claim 3, wherein the sleeve comprises a tube body and a pressing element, the pen rod is slidably disposed in the tube body, and the pressing element is movably disposed on the tube body.

10. The electronic assembly as claimed in claim 9, wherein the second connecting element further comprises a first position limiting portion connected to the pressing element and facing the pen rod, the third connecting element comprises a second position limiting portion corresponding to the first position limiting portion, wherein when the first end is moved to pass through the tube body, the first position limiting portion and the second position limiting portion are combined, such that the sleeve sleeves the first end.

11. The electronic assembly as claimed in claim 9, wherein the pressing element comprises a contact portion facing the pen rod, and the pen rod comprises a sensing portion corresponding to the contact portion, when the tube body sleeves the first end, and the contact portion corresponds to the sensing portion, the sensing portion is used for detecting a motion of the pressing element.

12. The electronic assembly as claimed in claim 1, wherein the first connecting element comprises a first engaging portion, the second connecting element comprises a second engaging portion corresponding to the first engaging portion, and the second engaging portion and the first engaging portion are engaged to each other to fix the sleeve to the housing.

13. The electronic assembly as claimed in claim 12, wherein the third connecting element comprises a third engaging portion corresponding to the second engaging portion, and when the first end is moved to pass through the sleeve, an engagement between the second engaging portion and the first engaging portion is released, and the second engaging portion and the third engaging portion are engaged to each other to make the sleeve to sleeve on the first end.

14. The electronic assembly as claimed in claim 13, wherein the first engaging portion comprises a first locking slot, the second engaging portion comprises a locking hook, a first protrusion and a second protrusion, and the locking hook and the second protrusion are respectively located at two opposite sides of the first protrusion, the third engaging portion comprises a second locking slot corresponding to the locking hook and the first protrusion and a third protrusion corresponding to the second protrusion, when the pen rod is moved to pass through the sleeve, the third protrusion pushes the first protrusion, and the first protrusion drives the locking hook to move out of the first locking slot, such that an engagement between the locking hook and the first locking slot is released, and when the locking hook and the first protrusion are moved to pass through the second locking slot, and the third protrusion leans against the second protrusion, the locking hook and the first protrusion move into the second locking slot to make the sleeve to sleeve on the first end.

15. The electronic assembly as claimed in claim 12, wherein the electronic device further comprises a third magnetic portion disposed corresponding to the receiving groove, the pen rod comprises a fourth magnetic portion corresponding to the third magnetic portion, and the fourth magnetic portion is disposed at the first end, when the sleeve sleeves the second end, and the first end is located in the receiving groove, the fourth magnetic portion and the third magnetic portion are magnetically attracted to position the first end in the receiving groove.

16. The electronic assembly as claimed in claim 12, wherein the sleeve has a third end and a fourth end opposite to each other, the second engaging portion is disposed at the third end, and the third end leans around the opening.

17. The electronic assembly as claimed in claim 16, wherein the pen rod comprises a stop portion located on the second end, the third end and the stop portion are respectively located at two opposite sides of the fourth end, and the stop portion is used for limiting a sliding stroke of the sleeve on the pen rod.

18. The electronic assembly as claimed in claim 17, wherein an outer diameter of the stop portion is greater than an inner diameter of the fourth end of the sleeve.

19. The electronic assembly as claimed in claim 12, wherein the sleeve comprises a tube body and a pressing element, the pen rod is slidably disposed in the tube body, and the pressing element is movably disposed on the tube body.

20. The electronic assembly as claimed in claim 19, wherein the pen rod comprises a sensing portion disposed at the first end, when the tube body sleeves the first end, and the pressing element corresponds to the sensing portion, the sensing portion is used for detecting a motion of the pressing element.

* * * * *